(12) United States Patent
Sai et al.

(10) Patent No.: US 8,339,665 B2
(45) Date of Patent: Dec. 25, 2012

(54) TEXTURE MAP OF PAINT COLORS, AND ITS PRODUCTION METHOD, PRODUCTION PROGRAM, PRODUCTION SYSTEM AND DATA STRUCTURE

(75) Inventors: Keisuke Sai, Hiratsuka (JP); Tsukasa Fujieda, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 915 days.

(21) Appl. No.: 12/447,069

(22) PCT Filed: Aug. 27, 2007

(86) PCT No.: PCT/JP2007/066550
§ 371 (c)(1),
(2), (4) Date: Apr. 24, 2009

(87) PCT Pub. No.: WO2008/059649
PCT Pub. Date: May 22, 2008

(65) Prior Publication Data
US 2009/0284772 A1  Nov. 19, 2009

(30) Foreign Application Priority Data

Nov. 15, 2006 (JP) ................................. 2006-309397

(51) Int. Cl.
*G06F 15/00* (2006.01)
(52) U.S. Cl. ........................... 358/1.9; 345/589; 345/600
(58) Field of Classification Search .................. 358/1.9; 356/446, 402; 345/600
See application file for complete search history.

(56) References Cited

U.S. PATENT DOCUMENTS

| 6,747,662 | B2 | 6/2004 | Masuda et al. | |
| 6,992,277 | B2 | 1/2006 | Masuda et al. | |
| 2002/0063721 | A1* | 5/2002 | Masuda et al. | 345/600 |
| 2002/0163640 | A1 | 11/2002 | Masuda | |
| 2003/0193669 | A1* | 10/2003 | Takagi | 356/446 |
| 2004/0179023 | A1 | 9/2004 | Masuda et al. | |

FOREIGN PATENT DOCUMENTS

| DE | 102 08 696 | 9/2002 |
| EP | 0 932 038 | 7/1999 |

(Continued)

OTHER PUBLICATIONS

Supplementary European Search Report issued Nov. 23, 2009 in Application No. EP 07 80 6091.

(Continued)

*Primary Examiner* — Marivelisse Santiago Cordero
*Assistant Examiner* — Moustapha Diaby
(74) *Attorney, Agent, or Firm* — Wenderoth, Lind & Ponack, L.L.P.

(57) ABSTRACT

A method including: determining at least three characteristic quantities, using a plurality of spectral reflectances measured at a plurality of light-receiving angles, for each of the plurality of paint colors; subjecting a data group including the at least three characteristic quantities to principal component analysis so as to determine a First Principal Component and Second Principal Component expressed as linear expressions, using the characteristic quantities; calculating values of the First Principal Component and Second Principal Component for the plurality of paint colors; and positioning the paint colors on a two-dimensional plane that has the First Principal Component and Second Principal Component as the two parameters and has values of the First Principal Component and Second Principal Component as coordinates.

5 Claims, 4 Drawing Sheets

FOREIGN PATENT DOCUMENTS

| | | |
|---|---|---|
| EP | 1 353 156 | 10/2003 |
| JP | 11-211569 | 8/1999 |
| JP | 2003-279413 | 10/2003 |

OTHER PUBLICATIONS

Francisco H. Imai et al., "A Comparative Analysis of Spectral Reflectance Estimated in Various Spaces Using a Trichromatic Camera System", Journal of Imaging Science and Technology, Society of Imaging Science & Technology, Springfield, VA, US, vol. 44, No. 4, Jul. 1, 2000, pp. 280-287.

International Search Report issued Sep. 25, 2007 in the International (PCT) Application No. PCT/JP2007/066550.

A. G. Mignani et al., "Spectral nephelometry for making extravirgin olive oil fingerprints", Sensors and Actuators B, vol. 90, No. 1, Apr. 20, 2003, pp. 157-162.

\* cited by examiner fig.1 fig.2 fig.3 fig.4 fig.5 fig.6 fig.7 fig.8

TEXTURE MAP OF PAINT COLORS, AND ITS PRODUCTION METHOD, PRODUCTION PROGRAM, PRODUCTION SYSTEM AND DATA STRUCTURE

TECHNICAL FIELD

The present invention relates to a texture map of paint colors in which a plurality of paint colors are arranged on a plane by their textures; and its production method, production program, production system and data structure. The texture map of paint colors is a color map in which a plurality of paint colors are arranged on a plane. The map may be in the form of an image displayed on a color display apparatus, or in the form of an image printed on paper or a resin film.

BACKGROUND ART

When improving the marketability of an industrial product, the exterior design is as important as the basic performance and mechanism of the product. Color is a significant part of the exterior design. In addition, it is a usual practice to coat industrial products for the purpose of protection or improving appearance. Therefore, it is a designer's task to determine the paint color in consideration of functions and characteristics of the industrial product, the customer's request etc.

Clients (such as a manufacturer's designers) make diverse demands regarding the color textures of industrial products. Moreover, clients often make abstract requests for product colors, such as "metallic, translucent, and solid-hard texture". Paint company designers select paint colors based on their knowledge and experience on the demands of the client. However, such abstract requests can be interpreted differently by different designers. Therefore, color texture requests from a manufacturer's designers are often misunderstood by the paint company designers who actually design the paint colors. This has causes difficulty during the design of paint colors of industrial products. Note that, in this specification, "texture" denotes an impression of a paint color.

There is a way to define paint colors; specifically, there is a way to objectively specify a paint color, using various color chips, color names, or stimulus values in a color space. However, this method is still incapable of defining the relationship between a paint color and its texture. Moreover, among paint colors, it is difficult to define metallic colors by a simple definition because their appearances vary depending on the observation angle.

"Metallic color" is the general name for paint colors whose appearances vary depending on the observation angle, while the paint colors whose appearances are constant regardless of the observation angle are called "solid colors". Examples of metallic colors include pearl paint colors containing pearl pigments, such as titanium dioxide-coating mica pigments, which exhibit interference colors; and multicolor or bicolor paint colors containing particular effect pigments that cause the color shift (change in color appearance depending on the observation angle).

Therefore, for example, the manufacturing of cars, which are often painted in metallic colors, requires many industrial steps to match the image of the car company designer with the image of the paint company designer. This consumes much of time during car production.

When a car company designer explains the concept of an exterior color, the designer often uses an image board comprising of magazine clippings and/or photos to help interpretation of the abstract requests. While referring to the image board, the paint company designer finds the best color from color stocks that have been designed or used before, or designs a new color, in order to realize a paint color whose appearance matches that of the explained color image. This process depends on the skill of the paint company designer.

This color selection process to find the paint color that best matches the abstract color image request becomes easier if the paint colors are classified and arranged on a two-dimensional map by texture. Further, such a map containing a plurality of paint colors arranged in a two-dimensional manner is useful to grasp the textures of the paint colors.

For example, Japanese Unexamined Patent Publication No. 1999-211569 discloses a method of classifying and arranging metallic paint colors, comprising calculating a hue-tone value of a representative metallic paint color, and classifying and arranging the metallic paint colors on a known hue-tone chart.

Further, Japanese Unexamined Patent Publication No. 2003-279413 discloses a method of quantifying the textures, such as metallic appearance or clearness, of metallic paint colors, based on evaluation values obtained from colorimetric values of the paint colors by using a specific function.

Patent Document 1: Japanese Unexamined Patent Publication No. 1999-211569

Patent Document 2: Japanese Unexamined Patent Publication No. 2003-279413

SUMMARY OF THE INVENTION

However, although the method disclosed in Japanese Unexamined Patent Publication No. 1999-211569 is capable of accurately classifying the appearance of each color, it is incapable of showing a correlation between a paint color and its texture.

Moreover, although the method disclosed in Japanese Unexamined Patent Publication No. 2003-279413 enables comparison between metallic paint colors by quantifying the particular textures of the metallic paint colors by using evaluation values, it is incapable of classifying and arranging a plurality of paint colors by textures.

In the field of paint color development, the paint color textures are expressed using terms like metallic appearance, appearance depth, translucency, sparkly appearance, clearness, density etc. Further, many attempts have been conducted to evaluate paint colors using various axes. In addition to the "metallic appearance" etc., a multiplicity of words has been used by people to express their images of color texture, such as lightness, heaviness, solidity, classiness, luxuriousness, sportiness, technicality, femininity etc. Such literal expressions are limitless and increasing. Therefore, the need to classify and arrange colors by textures is increasing.

Accordingly, an object of the present invention is to provide a paint color texture map in which a plurality of paint colors are arranged to be easily classified by their textures; and its production method, production program, production system and data structure.

Technical Solution

A paint color texture map production method (1) of the present invention is a method of producing a paint color texture map in which a plurality of paint colors are arranged on a two-dimensional plane using coordinate axes of two parameters that represent color and texture of the paint colors, the method comprising: a first step of determining at least three characteristic quantities, using a plurality of spectral reflectances measured at a plurality of light-receiving angles, for each of the plurality of paint colors; a second step of subjecting a data group including the at least three characteristic quantities to principal component analysis so as to determine a First Principal Component and Second Principal Component expressed as linear expressions, using the characteristic quantities; a third step of calculating values of the First Principal Component and Second Principal Component for the plurality of paint colors; and a fourth step of positioning the paint colors on a two-dimensional plane which has the First Principal Component and Second Principal Component as the two parameters, and has values of the First Principal Component and Second Principal Component as coordinates, wherein: the characteristic quantities are selected from the group consisting of IV value, SV value, FF value, cFF value, metallic appearance index, appearance depth index, and Definition; the IV value is Value Y in the XYZ color space determined by a spectral reflectance measured at a deflection angle 15 degree; the SV value is Value Y in the XYZ color space determined by a spectral reflectance measured at a deflection angle 45 degree; the FF value is determined by $2\times(Y_{15}-Y_{45})/(Y_{15}+Y_{45})$, where Value Y in the XYZ color space determined by a spectral reflectance measured at a deflection angle 15 degree is $Y_{15}$, and Value Y in the XYZ color space determined by a spectral reflectance measured at a deflection angle 45 degree is $Y_{45}$; the cFF value is determined by $2\times(c^*_{15}-c^*_{45})/(c^*_{15}+c^*_{45})$, where Value c* in the L*c*h color space determined by a spectral reflectance measured at a deflection angle 15 degree is $c^*_{15}$, and Value c* in the L*c*h color space determined by a spectral reflectance measured at a deflection angle 45 degree is $c^*_{45}$; the metallic appearance index is determined by $Y_{15}\times FF^2$, using the $Y_{15}$ and FF; the appearance depth index is determined by $c^*_R/L^*_R$, where Value L* and Value c* in the L*c*h color space determined by the spectral reflectance of representative angle are $L^*_R$ and $C^*_R$, respectively; and the Definition is determined by sqrt $(L^{*2}_R+c^{*2}_R)$, using the $L^*_R$ and $c^*_R$.

A paint color texture map production method (2) of the present invention is a method of producing a paint color texture map according to the method (1), wherein the two parameters are a parameter of representing shading appearance of each paint color and a parameter representing appearance heaviness of each paint color.

A paint color texture map production method (3) of the present invention is a method of producing a paint color texture map according to the method (1), wherein the two-dimensional plane is a surface of paper or a resin film, and the plurality of paint colors are arranged on the surface by printing or drawing.

A paint color texture map of the present invention is a paint color texture map in which a plurality of paint colors are arranged on a two-dimensional plane using coordinate axes of two parameters that represent color and texture of the paint colors, wherein the two parameters are a First Principal Component and Second Principal Component determined by subjecting a data group including at least three characteristic quantities to principal component analysis, and the characteristic quantities are determined based on a plurality of spectral reflectances obtained by measuring each of the plurality of paint colors at a plurality of light-receiving angles; the characteristic quantities are selected from the group consisting of IV value, SV value, FF value, cFF value, metallic appearance index, appearance depth index, and Definition; the IV value is Value Y in the XYZ color space determined by a spectral reflectance measured at a deflection angle 15 degree; the SV value is Value Y in the XYZ color space determined by a spectral reflectance measured at a deflection angle 45 degree; the FF value is determined by $2\times(Y_{15}-Y_{45})/(Y_{15}+Y_{45})$, where Value Y in the XYZ color space determined by a spectral reflectance measured at a deflection angle 15 degree is $Y_{15}$, and Value Y in the XYZ color space determined by a spectral reflectance measured at a deflection angle 45 degree is $Y_{45}$; the cFF value is determined by $2\times(c^*_{15}-c^*_{45})/(c^*_{15}+c^*_{45})$, where Value c* in the L*c*h color space determined by a spectral reflectance measured at a deflection angle 15 degree is $c^*_{15}$, and Value c* in the L*c*h color space determined by a spectral reflectance measured at a deflection angle 45 degree is $c^*_{45}$; the metallic appearance index is determined by $Y_{15}\times FF^2$, using the $Y_{15}$ and FF; the appearance depth index is determined by $c^*_R/L^*_R$, where Value L* and Value c* in the L*c*h color space determined by the spectral reflectance of representative angle are $L^*_R$ and $c^*_R$, respectively; and the Definition is determined by sqrt $(L^{*2}_R+c^{*2}_R)$, using the $L^*_R$ and $C^*_R$.

A paint color texture map production program of the present invention is a program for producing a paint color texture map in which a plurality of paint colors are arranged on a two-dimensional plane using coordinate axes of two parameters that represent color and texture of the paint colors, the program causing a computer to execute: a first function of determining at least three characteristic quantities, using a plurality of spectral reflectances that are measured at a plurality of light-receiving angles for each of the plurality of paint colors, and recorded in a recording apparatus; a second function of subjecting a data group including the at least three characteristic quantities to principal component analysis so as to determine a First Principal Component and Second Principal Component expressed as linear expressions, using the characteristic quantities; and a third function of calculating values of the First Principal Component and Second Principal Component for each of the plurality of paint colors; and a fourth function of positioning the paint colors on a two-dimensional plane which has the First Principal Component and Second Principal Component as the two parameters and has values of the First Principal Component and Second Principal Component as coordinates, so as to produce image data of a texture map, wherein: the characteristic quantities are selected from the group consisting of IV value, SV value, FF value, cFF value, metallic appearance index, appearance depth index, and Definition; the IV value is Value Y in the XYZ color space determined by a spectral reflectance measured at a deflection angle 15 degree; the SV value is Value Y in the XYZ color space determined by a spectral reflectance measured at a deflection angle 45 degree; the FF value is determined by $2\times(Y_{15}-Y_{45})/(Y_{15}+Y_{45})$, where Value Y in the XYZ color space determined by a spectral reflectance measured at a deflection angle 15 degree is $Y_{15}$, and Value Y in the XYZ color space determined by a spectral reflectance measured at a deflection angle 45 degree is $Y_{45}$; the cFF value is determined by $2\times(c^*_{15}-c^*_{45})/(c^*_{15}+c^*_{45})$, where Value c* in the L*c*h color space determined by a spectral reflectance measured at a deflection angle 15 degree is $c^*_{15}$, and Value c* in the L*c*h color space determined by a spectral reflectance measured at a deflection angle 45 degree is $c^*_{45}$; the metallic appearance index is determined by $Y_{15}\times FF^2$, using the $Y_{15}$ and FF; the appearance depth index is determined by $c^*_R/L^*_R$, where Value L* and Value c* in the L*c*h color space determined by the spectral reflectance of representative angle are $L^*_R$ and $c^*_R$, respectively; and the Definition is determined by sqrt $(L^*R^2+c^*R^2)$, using the $L^*_R$ and $c^*_R$.

A paint color texture map production system of the present invention is a system for producing a paint color texture map in which a plurality of paint colors are arranged on a two-dimensional plane using coordinate axes of two parameters that represent color and texture of the paint colors, the system comprising: an arithmetic unit; and a multiangle spectrophotometer, wherein: the multiangle spectrophotometer measures spectral reflectances at a plurality of light-receiving angles for each of the plurality of paint colors, which are then transmitted to the arithmetic unit; the arithmetic unit determines at least three characteristic quantities, using the plurality of spectral reflectances for each of the plurality of paint colors; the arithmetic unit subjects a data group including the at least three characteristic quantities to principal component analysis so as to determine a First Principal Component and Second Principal Component expressed as linear expressions, using the characteristic quantities; the arithmetic unit calculates values of the First Principal Component and Second Principal Component for the plurality of paint colors; the arithmetic unit positions the paint colors on a two-dimensional plane which has the First Principal Component and Second Principal Component as the two parameters and has values of the First Principal Component and Second Principal Component as coordinates so as to produce a paint color texture map; the characteristic quantities are selected from the group consisting of IV value, SV value, FF value, cFF value, metallic appearance index, appearance depth index, and Definition; the IV value is Value Y in the XYZ color space determined by a spectral reflectance measured at a deflection angle 15 degree; the SV value is Value Y in the XYZ color space determined by a spectral reflectance measured at a deflection angle 45 degree; the FF value is determined by $2\times(Y_{15}-Y_{45})/(Y_{15}+Y_{45})$, where Value Y in the XYZ color space determined by a spectral reflectance measured at a deflection angle 15 degree is $Y_{15}$, and Value Y in the XYZ color space determined by a spectral reflectance measured at a deflection angle 45 degree is $Y_{45}$; the cFF value is determined by $2\times(c^*_{15}-c^*_{45})/(c^*_{15}+c^*_{45})$, where Value $c^*$ in the L*c*h color space determined by a spectral reflectance measured at a deflection angle 15 degree is $c^*_{15}$, and Value $c^*$ in the L*c*h color space determined by a spectral reflectance measured at a deflection angle 45 degree is $c^*_{45}$; the metallic appearance index is determined by $Y_{15}\times FF^2$, using the $Y_{15}$ and FF; the appearance depth index is determined by $c^*_R/L^*_R$, where Value L* and Value c* in the L*c*h color space determined by the spectral reflectance of representative angle are $L^*_R$ and $c^*_R$, respectively; and the Definition is determined by sqrt $(L^*_R{}^2+c^*_R{}^2)$, using the $L^*_R$ and $c^*_R$.

A data structure of a paint color texture map of the present invention is a data structure for producing a paint color texture map in which a plurality of paint colors are arranged on a two-dimensional plane using coordinate axes of two parameters that represent color and texture of the paint colors, wherein: values of the two parameters representing coordinates on the two-dimensional plane are associated with data for specifying the paint colors, and the values of the two parameters are values of a First Principal Component and Second Principal Component, which are determined by: determining at least three characteristic quantities, using spectral reflectances that are measured at a plurality of light-receiving angles for each of the plurality of paint colors; subjecting a data group including the at least three characteristic quantities to principal component analysis so as to determine the First Principal Component and Second Principal Component expressed as linear expressions, using the characteristic quantities; calculating values of the First Principal Component and Second Principal Component for each of the plurality of paint colors; the characteristic quantities are selected from the group consisting of IV value, SV value, FF value, cFF value, metallic appearance index, appearance depth index, and Definition; the IV value is Value Y in the XYZ color space determined by a spectral reflectance measured at a deflection angle 15 degree; the SV value is Value Y in the XYZ color space determined by a spectral reflectance measured at a deflection angle 45 degree; the FF value is determined by $2\times(Y_{15}-Y_{45})/(Y_{15}+Y_{45})$, where Value Y in the XYZ color space determined by a spectral reflectance measured at a deflection angle 15 degree is $Y_{15}$, and Value Y in the XYZ color space determined by a spectral reflectance measured at a deflection angle 45 degree is $Y_{45}$; the cFF value is determined by $2\times(c^*_{15}-c^*_{45})/(c^*_{15}+c^*_{45})$, where Value $c^*$ in the L*c*h color space determined by a spectral reflectance measured at a deflection angle 15 degree is $c^*_{15}$, and Value $c^*$ in the L*c*h color space determined by a spectral reflectance measured at a deflection angle 45 degree is $c^*_{45}$; the metallic appearance index is determined by $Y_{15}\times FF^2$, using the $Y_{15}$ and FF; the appearance depth index is determined by $c^*_R/L^*_R$, where Value L* and Value c* in the L*c*h color space determined by the spectral reflectance of representative angle are $L^*_R$ and $c^*_R$, respectively; and the Definition is determined by sqrt $(L^*R^2+c^*_R{}^2)$, using the $L^*_R$ and $c^*_R$.

Effect of the Invention

The present invention enables classifying and arranging paint colors by positioning a plurality of paint colors, including not only solid colors but also metallic colors, on a plane with coordinate axes of two parameters expressing the color and texture of the paint colors.

This paint color texture map of the present invention enables visualization of the impressions of colors described with abstract words. More specifically, the texture map of the present invention allows the paint company designer to easily specify the color even when the client describes the color abstractly. Therefore, the paint color texture map of the present invention eases communication among people involved in the color design.

The paint color texture map of the present invention may be stored in a computer-readable recording medium (CD-ROM, IC memory, hard disk drive etc.) as electronic data (CG data, color image data etc.). Such a form is very useful, as the colors can be displayed on a display apparatus or printed. Moreover, by printing the paint color texture map of the present invention on the surface of paper or a resin film, it is possible to obtain a portable hard copy of the texture map (printed material), which allows easy reference to the texture map in any location. This ensures further usefulness.

Market research has been performed regarding car exterior colors based on car types and regions. The paint color texture map of the present invention can be used as a good reference for the evaluation of such market research result due to advantageously showing the features in the form of a distribution of paint colors.

BEST MODE FOR CARRYING OUT THE INVENTION

Figure 1:
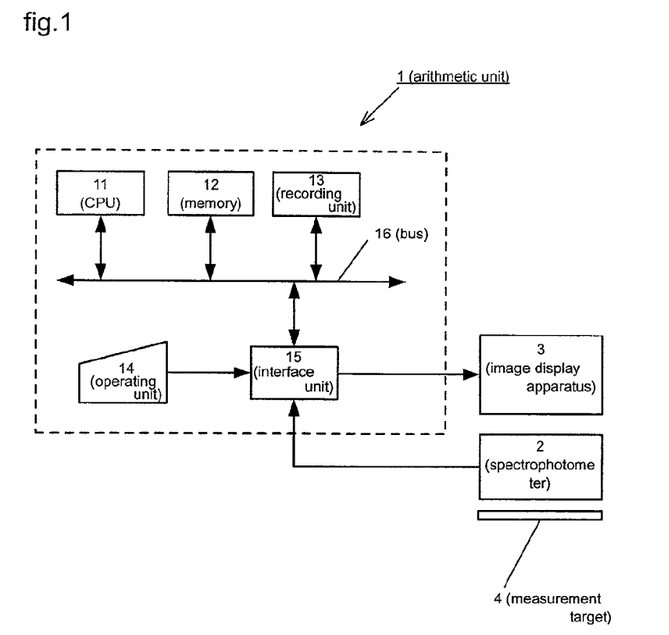
FIG. 1 is a block diagram showing a schematic structure of a paint color texture map production system according to one embodiment of the present invention.

One embodiment of the present invention is described below with reference to drawings. FIG. 1 is a block diagram showing a schematic structure of a paint color texture map production system according to one embodiment of the present invention. The texture map production system includes an arithmetic unit 1, a spectrophotometer 2, and an image display apparatus 3.

The arithmetic unit 1 includes: a CPU 11 configured to control the componential units of the system and execute the predetermined steps described below; a memory 12; a recording unit 13; an operating unit 14 for receiving external operations; an interface unit (hereinafter referred to as an I/F unit) 15 serving as an interface between the operating unit 14 and an external apparatus; and a data bus 16 for carrying out data transmission between the componential units. The arithmetic unit 1 obtains spectral reflectances measured by the spectrophotometer 2, via the I/F unit 15. FIG. 1 also shows a measurement target (also referred to as a coating film) 4 with a painted surface, which is subjected to the measurement by the spectrophotometer 2. The image display apparatus 3 may be a display device capable of full-color display or a printer capable of full-color printing. As described later, the CPU 11 produces a texture map and transmits the texture map to the image display apparatus 3 via the I/F unit 15 so that a color image of the map is shown (as a color display, color printing etc.).

Figure 2:
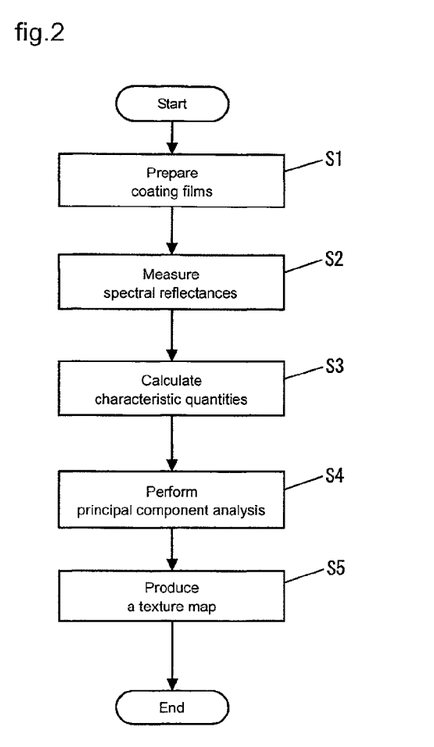
FIG. 2 is a flow chart showing operations of a paint color texture map production system according to one embodiment of the present invention.

FIG. 2 is a flow chart showing operations of the texture map production system shown in FIG. 1. The following explains the operations of the texture map production system, with reference to the flow chart of FIG. 2.

The following steps are carried out by the CPU 11, unless otherwise specified. The CPU 11 temporarily stores all the necessary data items (setting values, data being processed etc.) in the memory 12 which serves as a working space. The CPU 11 also stores data items that need to be kept for a certain period, such as calculation results, in the recording unit 13. In the recording unit 13, color codes for specifying colors, and corresponding RGB data serving as color data are previously stored. Note that the image display apparatus 13 is a color display device.

In Step S1, a user prepares coating films. The coating films may be prepared by coating plates with predetermined paints; however, the present embodiment uses conventional color sample cards.

In Step S2, the spectrophotometer 2 measures spectral reflectances of each coating film prepared in Step S1. As mentioned above, metallic paint colors vary in appearance depending on the observation angle; therefore, in the present embodiment, the spectral reflectances are measured at different angles. Specifically, each coating film is irradiated with light from a direction of 45 degree (an angle within the plane vertical to the surface of the coating film) with respect to its surface, and the spectral reflectances are measured at five observation angles (also referred to as light-receiving angles), 15, 25, 45, 75, and 110 degrees, which are deflection angles (angles within the plane vertical to the surface of the coating film) based on the direction of the specular reflection light. The spectrophotometer is, for example, a multi-angle spectrophotometer MA68II (produced by X-Rite, Inc.) or the like.

The measurement data of the spectral reflectances is transmitted to the arithmetic unit 1 via the I/F unit 15, and is stored in the recording unit 13. When being stored, each set of the measurement data is associated with ID data of the corresponding paint color and with data denoting the deflection angles in the measurement. In the present embodiment using conventional color sample cards, each ID data of the paint color is inputted from the operating unit 14 or the like as a color code. The data denoting the deflection angles may be stored as the values of angles, or as codes for identifying the five angles. In the present embodiment, solid colors and metallic colors are treated in the same manner.

In Step S3, using the spectral reflectances measured in Step S2, characteristic quantities are calculated for each paint color as detailed below. The calculation results are associated with the ID data of the paint color when stored in the recording unit 13.

First, based on the spectral reflectance at 15 degree, Value Y (brightness: $Y_{15}$, hereinafter) in the XYZ color space is calculated as Characteristic Quantity IV. Further, based on the spectral reflectance at 45 degree, Value Y ($Y_{45}$, hereinafter) in the XYZ color space is calculated as Characteristic Quantity SV. Then, with these values $Y_{15}$ and $Y_{45}$, Characteristic Quantity FF is calculated according to $2\times(Y_{15}-Y_{45})/(Y_{15}+Y_{45})$. FF is an index showing a degree of change in brightness of a metallic color with a change in the observation direction. Further, Characteristic Quantity Metal (may also be referred to as metallic appearance index) is also calculated according to $Y_{15}\times FF^2$.

Next, based on the spectral reflectance at 15 degree, Value c* (chroma) in the L*c*h color space is calculated as $c^*_{15}$. Further, based on the spectral reflectance at 45 degree, Value c* in the L*c*h color space is calculated as $c^*_{45}$. Then, Characteristic Quantity cFF is determined according to $2\times(c^*_{15}-c^*_{45})/(c^*_{15}+c^*_{45})$. cFF is an index showing a chroma converted from the above-mentioned brightness; in other words, cFF is an index showing a degree of change in chroma with a change in the observation direction.

Next, Representative Angle D corresponding to a representative color of the metallic paint color is determined. As mentioned above, metallic paint colors vary in appearance depending on the observation angle; therefore, a known method suggests selecting one color as a representative of metallic paint colors, and determining a Representative Angle D as the angle at which the color is observed, using a calorimetric value (refer to Japanese Unexamined Patent Publication No. 1999-211569). In the present embodiment, Representative Angle D is determined according to the following Formula 1 using Value L* and Value c* obtained from the spectral reflectances at 25 and 45 degrees in Step S2.

$$D = 0.061 \times \mathrm{sqrt}\,(L^{*2}_{25} + c^{*2}_{25}) + 0.253 \times \mathrm{sqrt}\,(L^{*2}_{45} + c^{*2}_{45}) + 15.105 \quad \text{(Formula 1)},$$

wherein sqrt represents square root.

Note that, since the method of determining Representative Angle D is disclosed in Japanese Unexamined Patent Publication No. 1998-10045, the explanation thereof is omitted here.

As described above, the spectral reflectances are measured only at the five angles (15, 25, 45, 75, and 110 degrees); therefore, if the Representative Angle D is not any of the above five angles, the spectral reflectance R of the Representative Angle D is determined as follows (refer to Japanese Unexamined Patent Publication No. 1998-10045).

$$10 \leq D < 25: R = \exp(a1 \times D + b1)$$

$$25 \leq D < 75: R = \exp(a2 \times D^2 + b2 \times D + c2)$$

$$75 \leq D \leq 110: R = a3 \times D + b3$$

Here, the coefficients a1 to a3, b1 to b3, and c2 are regression coefficients, which are determined by a least-squares method for each color.

Based on the spectral reflectance R of Representative Angle D thus determined, Value L* and Value c* in the L*c*h color space are calculated. With the obtained $L^*_R$ and $c^*_R$, Characteristic Quantity Deepness (may also referred to as an index of appearance depth) is determined according to $c^*_R/L^*_R$. Characteristic Quantity Senmei (may also be referred to as Definition) is determined according to sqrt $(L^{*2}_R + c^{*2}_R)$.

In such a manner, seven types of characteristic quantities IV, SV, FF, cFF, Metal, Deepness, and Senmei are determined for each paint color. These seven values of characteristic quantities are associated with the ID data (color code) of the paint color when stored in the recording unit 13.

In Step S4, principal component analysis is performed with respect to a data group consisting of seven characteristic quantities determined for each paint color in Step S3, so as to determine the formulas for a First Principal Component and Second Principal Component. In this step, the above-mentioned characteristic quantities obtained from the spectral reflectances are expressed in different units of magnitude; therefore, before the principal component analysis is performed, each data of Characteristic Quantity is normalized.

$$z_{ij} = (p_{ij} - m_j)/s_j$$

Here, the subscript "j" represents the type of Characteristic Quantity; "$P_{ij}$" represents i-th data of Characteristic Quantity "j" before normalization; "$z_{ij}$" represents i-th data of Characteristic Quantity "j" after normalization; and "$m_j$" and "$s_j$" represent mean value and standard deviation of the Characteristic Quantity "j", respectively. Since the principal component analysis is a known technique, an example of the result is shown, but the explanation thereof is omitted.

A total of 3,400 colors were selected as samples of paint colors from the automobile color samples "Auto Colors" published by the Japan Paint Manufacturers Association, and also from the automobile exterior color sample cards of Kansai Paint Co., Ltd. developed on or after 1996. The spectral reflectances for each of the 3,400 colors were measured using a multiangle spectrophotometer (MA68II: produced by X-Rite, Inc.), and the principal component analysis was performed using the calculated characteristic quantities. As a result, the First Principal Component A1 and Second Principal Component A2 were determined as shown in Formula 2 and Formula 3.

$$A1 = -0.803 + 0.267 \times IV + 0.253 \times SV - 0.084 \times FF - 0.145 \times cFF + 0.188 \times \text{Metal} - 0.197 \times \text{Deepness} + 0.26 \times \text{Senmei} \quad \text{(Formula 2)}$$

$$A2 = -0.947 + 0.204 \times IV - 0.189 \times SV + 0.415 \times FF + 0.256 \times cFF + 0.321 \times \text{Metal} - 0.168 \times \text{Deepness} + 0.128 \times \text{Senmei} \quad \text{(Formula 3)}$$

The cumulative proportion of the First and Second Principal Component was 67.1%. Accordingly, the First and Second Principal Component are useful to classify and arrange metallic paint colors that greatly vary in texture.

The formulas (Formula 2, Formula 3) for the First and Second Principal Components are regarded as relational expressions that denote the textures by characteristic vectors, the coefficients of the principal component formulas, etc. As described later, First Principal Component A1 represents an appearance heaviness, in which a negative value expresses a heavy appearance, and a positive value expresses a light appearance. Second Principal Component A2 represents a shading appearance, in which a negative value expresses a solid appearance, and a positive value expresses a metallic appearance.

In Step S5, computer graphic images (hereinafter referred to as CG images) of the paint colors are drawn on a plane (also referred to as a mapping plane) that have coordinate axes respectively expressing the First and Second Principal Components determined in Step S4. More specifically, by calculating the values of the First and Second Principal Components using the data of seven characteristic quantities of a paint color, the position (coordinate) of each paint color on the mapping plane is determined. Next, a search is carried out to find corresponding RGB data from the sets of color codes and associated RGB data that are previously stored in the recording unit 13, by using the color code of the paint color. With the obtained RGB data, CG data is produced so that a graphic of a predetermined size appears on the specific position in a color display device.

In such a manner, CG data of a texture map, in which a plurality of paint colors are arranged on a plane that have coordinate axes respectively expressing appearance heaviness and appearance lightness, is produced and shown on a color display apparatus. The image display apparatus 3 is not limited to a display device, and may be a printing apparatus such as a printer.

Figure 3:
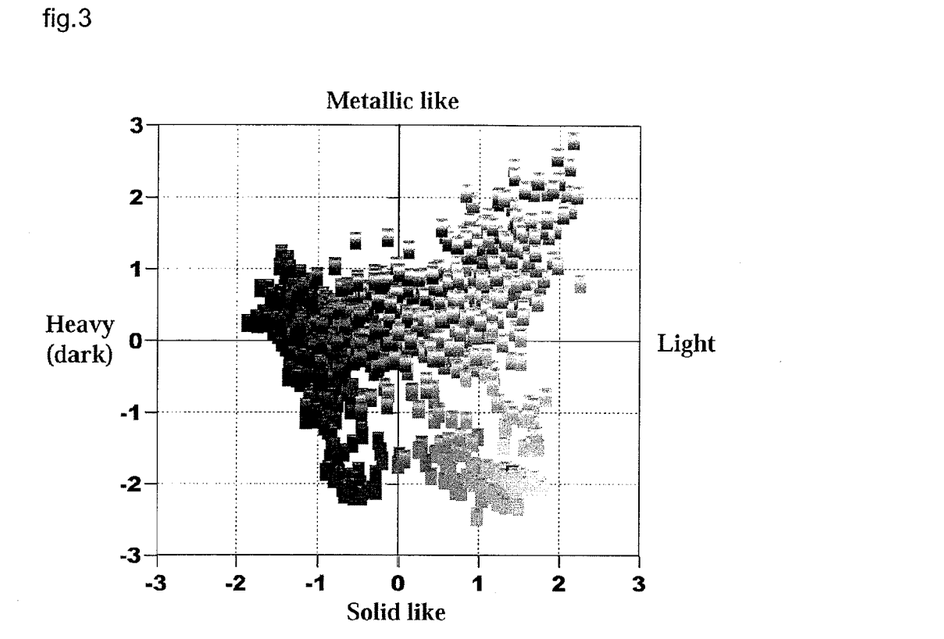
FIG. 3 is a luminance image of a paint color texture map, which is produced using the present invention based on the paint colors according to Auto Colors 2004.
Figure 4:
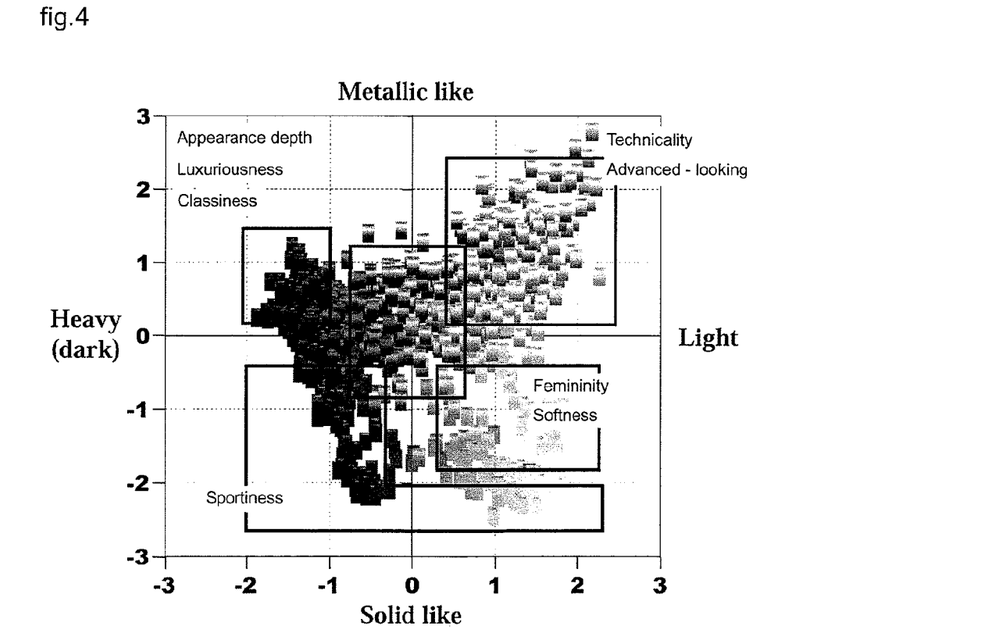
FIG. 4 is a luminance image of a paint color texture map, which is produced using the present invention based on the paint colors according to Auto Colors 2004.

FIG. 3 and FIG. 4 show examples of image data produced in the above method, displayed on the image display apparatus 3. FIG. 3 is a luminance image of a full-color "texture map" on which the paint colors from the Auto Color are plotted in a mapping plane. FIG. 4 is a texture map produced by superimposing texts (appearance depth, luxuriousness, classiness, etc.) and frames onto the texture map of FIG. 3. Each text describes a color texture and each frame defines the texture region which can be described by each text. The First and Second Principal Components are calculated using Formula 2 and Formula 3. The horizontal axis represents First Principal Component A1, and the vertical axis represents Second Principal Component A2. Note that a square region corresponding to a solid paint color is painted with one color, whereas a square region corresponding to a metallic color has a highlight with a vertical gradation (FIG. 5 and FIG. 6 described later are drawn in a similar manner).

As shown in FIG. 3 and FIG. 4, relative to the original point, the heaviness appearance increases as the position moves to the left, and the lightness appearance increases as the position moves to the right. Similarly, the solid appearance increases as the position moves downward, and the metallic appearance increases as the position moves upward.

By thus arranging a plurality of paint colors on a map as shown in FIG. 4, the paint colors having similar appearances can be adjacently positioned, and the visual impressions of the paint colors can be grouped. Further, since this map arranges the paint colors in the form of tiny images, the impression of each color is visualized; therefore, the map is useful during communication between designers. More specifically, even when a client makes an abstract request for a color, the texture map of the present invention allows a paint company designer to easily specify the color.

Figure 5:
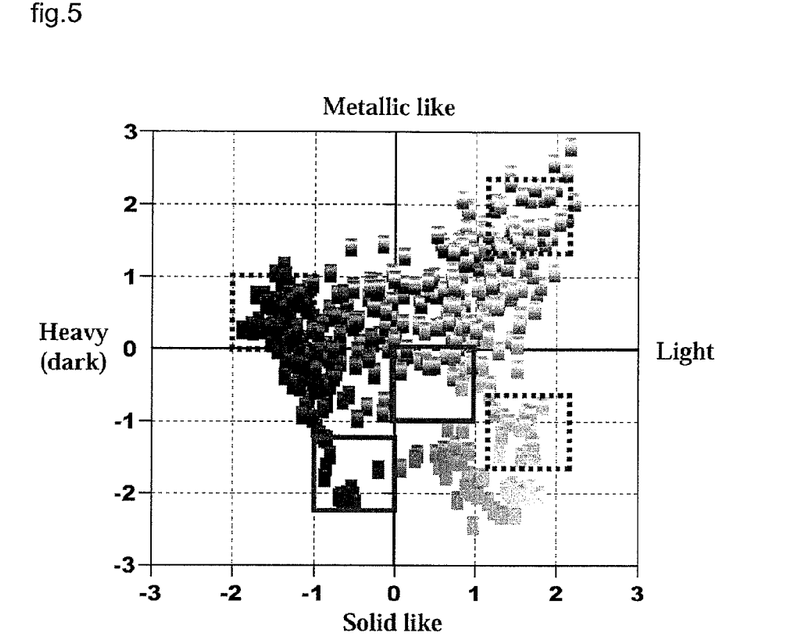
FIG. 5 is a luminance image of a paint color texture map, which is produced using the present invention based on the colors used for the automobiles produced by Japanese car companies in the year 2004.
Figure 6:
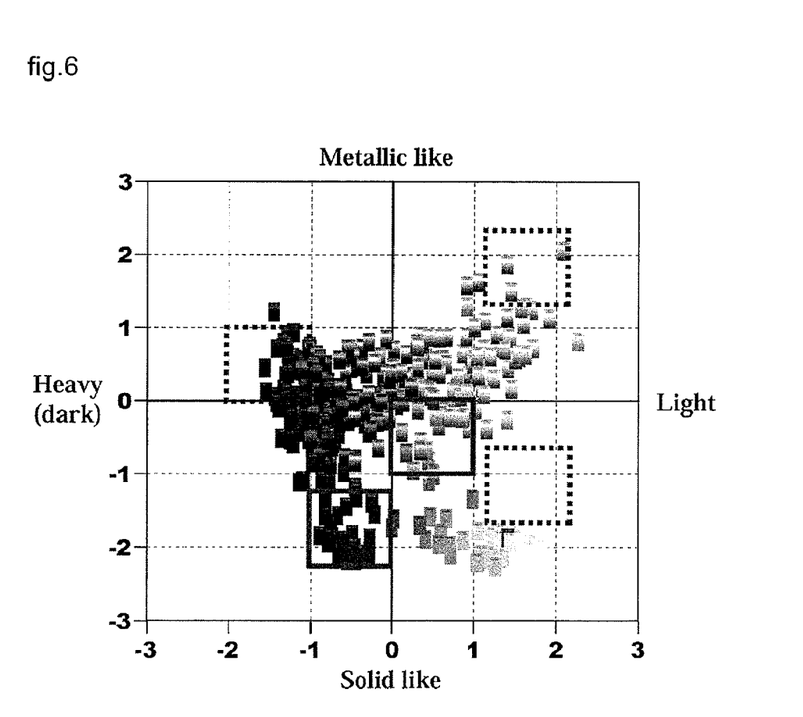
FIG. 6 is a luminance image of a paint color texture map, which is produced using the present invention based on the colors having been used for the automobiles produced by European car companies.

FIG. 5 and FIG. 6 are texture maps for different groups of paint colors, produced in the above method. FIG. 5 is a texture map of the colors used for automobiles produced by Japanese car companies in the year 2004. FIG. 6 is a texture map of the colors having been used for automobiles produced by European car companies during the years 2000 to 2005. FIG. 5 and FIG. 6 are both luminance images of full-color texture maps, as with those in FIG. 3 and FIG. 4.

In FIG. 5 and FIG. 6, dashed squares denote regions of textures representing colors often used for Japanese cars (the colors used for car exterior colors specific to the Japanese market); and solid squares denote regions of textures representing colors often used for European cars (the colors used for car exterior colors specific to the European market). Referring to these texture maps, the popular or unpopular color range for Japanese cars and that for European cars are very apparent. Therefore, the texture map of the present invention is also useful for market research analysis.

Relation Between Principal Component and Texture

The following is verification result of the relevance of First and Second Principal Components A1 and A2 to the results of the sensory evaluation test of color texture (impression from each paint color).

Among the aforementioned paint colors from the Auto Color, 20 color samples (A to T) varied in First Principal Component A1 were selected, and a plurality of observers (paint company designers) placed the samples in order of visual appearances heaviness and lightness. More specifically, the observers placed the samples in ascending order from light to heavy. Table 1 shows the values of the First Principal Components of the paint color samples, the order of the values (from greatest to least), and the order of heaviness to lightness in visual impression.

Further, the relation between the order of the First Principal Component and the order of the visual appearance was verified using a Spearman rank-correlation coefficient "rs" (Formula 4) (refer to "Sinpan Kan-nou Kensa handbook (new edition of sensory test handbook)", Union of Japanese Scientists and Engineers, 1979).

$$rs = 1 - 6 \times \Sigma d_i^2 / (n^3 - n) \quad \text{(Formula 4)}$$

Here, $d_i$ represents the difference between the actual order of the First Principal Component for each paint color and the visual order; n represents the number of samples; $\Sigma$ represents sum of i (sum of the paint colors).

Figure 7:
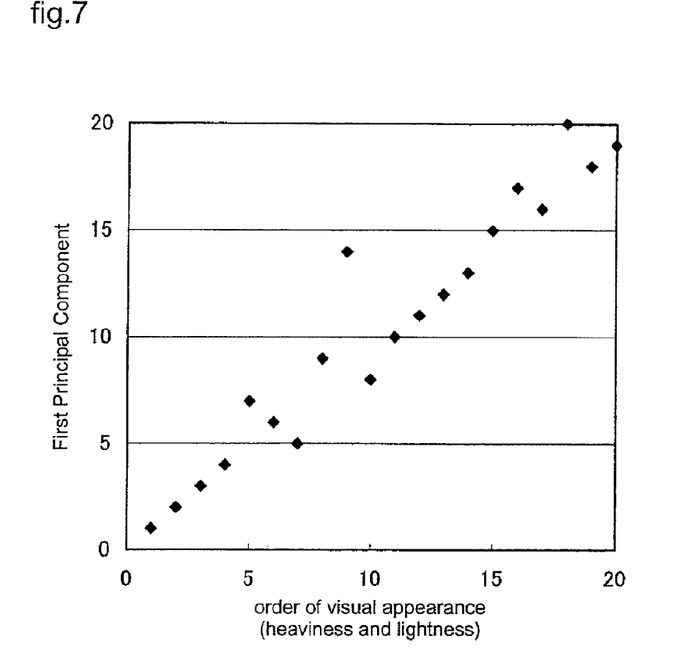
FIG. 7 is a graph on which the order shown in Table 1 is plotted using the vertical and horizontal axes.

According to the calculation using Formula 4, the rank-correlation coefficient rs was 0.96. This revealed that the order of the First Principal Component shown in Table 1 and FIG. 7 is highly relevant to the order of visual appearance heaviness and lightness. This high relevance can also be seen in reference to FIG. 7, which is a graph on which the order shown in Table 1 is plotted using the vertical and horizontal axes.

Similarly, the relation between the Second Principal Component and solid or metallic appearance was verified using the same 20 color samples (A to T). The observers placed the samples according to their visual appearances solid or metallic. More specifically, the observers placed the samples in ascending order from more visually metallic to more visually solid. Table 2 shows the values of the Second Principal Components of the paint color samples, the order of the values (from greatest to least), and the order of solid or metallic appearance in visual impression.

TABLE 1

| Sample | A | B | C | D | E | F | G | H | I | J |
|---|---|---|---|---|---|---|---|---|---|---|
| First Principal Component | 2.19 | 1.74 | 1.60 | 1.36 | 1.30 | 1.10 | 0.99 | 0.40 | 0.25 | 0.12 |
| Order of First Principal Component | 1 | 2 | 3 | 4 | 5 | 6 | 7 | 8 | 9 | 10 |
| Visual Order | 1 | 2 | 3 | 4 | 7 | 6 | 5 | 9 | 14 | 8 |

| Sample | K | L | M | N | O | P | Q | R | S | T |
|---|---|---|---|---|---|---|---|---|---|---|
| First Principal Component | 0.04 | −0.15 | −0.29 | −0.31 | −0.63 | −0.97 | −1.02 | −1.19 | −1.27 | −1.39 |
| Order of First Principal Component | 11 | 12 | 13 | 14 | 15 | 16 | 17 | 18 | 19 | 20 |
| Visual Order | 10 | 11 | 12 | 13 | 15 | 17 | 16 | 20 | 18 | 19 |

TABLE 2

| Sample | A | B | C | D | E | F | G | H | I | J |
|---|---|---|---|---|---|---|---|---|---|---|
| Second Principal Component | 2.78 | 1.88 | 1.82 | 1.71 | 1.43 | 1.22 | 1.14 | 1.01 | 0.82 | 0.72 |
| Order of Second Principal Component | 1 | 2 | 3 | 4 | 5 | 6 | 7 | 8 | 9 | 10 |
| Visual Order | 1 | 2 | 3 | 4 | 5 | 6 | 8 | 9 | 10 | 11 |

| Sample | K | L | M | N | O | P | Q | R | S | T |
|---|---|---|---|---|---|---|---|---|---|---|
| Second Principal Component | 0.56 | 0.44 | 0.01 | −0.02 | −0.07 | −0.23 | −0.83 | −1.08 | −1.10 | −1.95 |
| Order of Second Principal Component | 11 | 12 | 13 | 14 | 15 | 16 | 17 | 18 | 19 | 20 |
| Visual Order | 7 | 12 | 13 | 14 | 15 | 16 | 17 | 18 | 19 | 20 |

Figure 8:
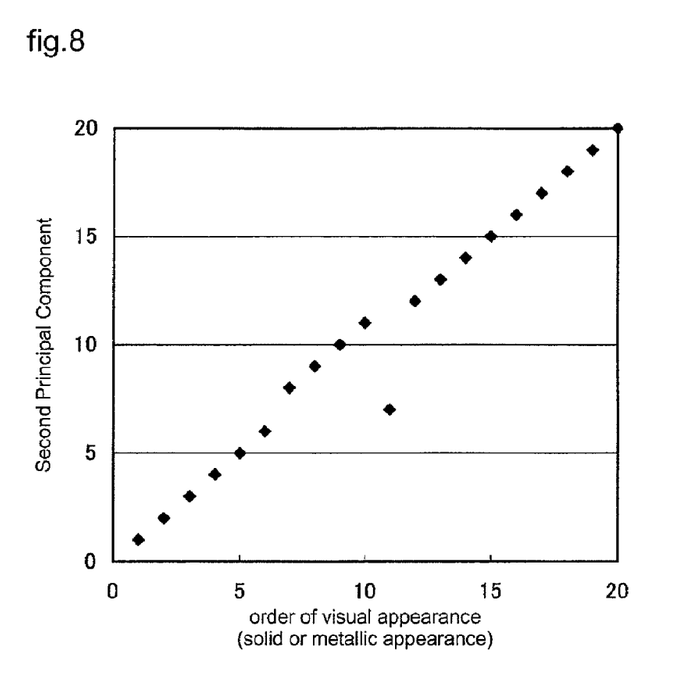
FIG. 8 is a graph on which the order shown in Table 2 is plotted using the vertical and horizontal axes.

The rank-correlation coefficient between the actual order of the Second Principal Component and the order of solid or metallic appearance in visual impression was 0.98. This revealed that they were highly relevant. This high relevance can also be seen in reference to FIG. 8, which is a graph on which the order shown in Table 2 is plotted using the vertical and horizontal axes.

These results show that the formulas (Formula 2 and Formula 3) for the First Principal Component and Second Principal Component according to principal component analysis using the aforementioned seven characteristic quantities are suitable for indices for quantitatively showing appearance heaviness and shading.

Though the above description explained the present invention with a specific embodiment, and showed the results of application of the present invention to a specific group of paint colors; the present invention is not limited to the above embodiment, but rather may be applied in many variations and applicable to various groups of paint colors.

For example, it is not always necessary to use all of the seven characteristic quantities; more specifically, a part of them, e.g., three characteristic quantities of three coefficients of greatest contribution to the First and Second Principal Components may be selected to be used as the factors of the above-mentioned texture map production. More specifically, as long as the spectral reflectances are measured from at least two directions out of the aforementioned five deflection angles, it is not necessary to perform measurement for all directions. Further, additional characteristic quantities other than the above three characteristic quantities may also be used.

Moreover, the characteristic quantities are not limited to those defined above. For example, although the aforementioned embodiment determined FF by measuring the spectral reflectances at deflection angles of 15 and 45 degrees, FF can be determined by measuring the spectral reflectances at other angles. Further, although the aforementioned embodiment determined Representative Angle D by measuring the spectral reflectances at deflection angles of 15 and 45 degrees; Representative Angle D can be determined by measuring the spectral reflectances at other deflection angles. As disclosed in Patent Document 2, Representative Angle D can be determined using spectral reflectances measured in the highlight side and in the shading side.

The aforementioned embodiment displays the texture map on a color display device; however, the present invention is not limited to this embodiment, and the texture map may be printed on paper or on a resin film by a color printer.

Further, the texture map may be stored in a computer-readable recording medium as CG data or binary bitmap data of a color image. The values of the First and Second Principal Components for each paint color may also be stored in such a medium by associating them with the data (color code etc.) for specifying the corresponding paint color. This enables the user to produce a paint color texture map using separately-supplied color data materials (RGB data etc.) that correspond to the data (color code etc.) for specifying the paint colors.

Instead of the data for specifying the paint colors, it is possible to store measurement values obtained by measuring the colors of the coating films using a calorimeter in Step S2 of FIG. 2, and associate these values with the First and Second Principal Components for each paint color. This enables the user to produce a paint color texture map without separately-supplied color data materials (RGB data etc.) that correspond to the data (color code etc.) for specifying the paint colors.

Further, the map production may be performed without using computer graphic; more specifically, after determining coordinates for the paint colors on a two-dimensional plane, the map may be produced by disposing the coordinate axes on a plane made of paper or a resin film, and disposing (by printing, drawing etc.) color regions of predetermined size expressing the paint colors on the predetermined positions of the plane specified by the coordinates of the paint colors.

Industrial Applicability

The present invention enables a plurality of paint colors, including not only solid colors but also metallic colors, to be arranged on a plane having coordinate axes representing two parameters, i.e., color and texture of the paint colors, thereby classifying and arranging the paint colors. Further, the paint color texture map of the present invention enables visualization of the impressions of colors described with abstract words, thereby allowing paint company designers to easily specify the target color even when a client describes the color abstractly.

The invention claimed is:

1. A method of producing a paint color texture map in which a plurality of paint colors are arranged on a two-dimensional plane using coordinate axes of two parameters that represent color and texture of the paint colors, the method comprising:

determining at least three characteristic quantities, using a plurality of spectral reflectances measured at a plurality of light-receiving angles, for each of the plurality of paint colors;

subjecting a data group including the at least three characteristic quantities to principal component analysis so as to determine a First Principal Component and Second Principal Component expressed as linear expressions, using the characteristic quantities;

calculating values of the First Principal Component and Second Principal Component for the plurality of paint colors; and positioning the paint colors on a two-dimensional plane which has the First Principal Component and Second Principal Component as the two parameters and has values of the First Principal Component and Second Principal Component as coordinates, wherein:

the characteristic quantities are selected from the group consisting of IV (intensity value) value, SV (scattering value) value, FF (flip flop) value, cFF (chroma flip flop) value, metallic appearance index, appearance depth index, and Definition; the IV value is Value Y (brightness) in the XYZ color space determined by a spectral reflectance measured at a deflection angle 15 degree;

the SV value is Value Y in the XYZ color space determined by a spectral reflectance measured at a deflection angle 45 degree;

the FF value is determined by $2 \times (Y15-Y45)/(Y15+Y45)$, where Value Y in the XYZ color space determined by a spectral reflectance measured at a deflection angle 15 degree is Y15, and Value Y in the XYZ color space determined by a spectral reflectance measured at a deflection angle 45 degree is Y45;

the cFF value is determined by $2 \times (c^*15-c^*45)/(c^*15+c^*45)$, where Value $c^*$ in the $L^*c^*h$ color space determined by a spectral reflectance measured at a deflection angle 15 degree is $c^*\mathbf{15}$, and Value $c^*$ in the $L^*c^*h$ color space determined by a spectral reflectance measured at a deflection angle 45 degree is $c^*\mathbf{45}$, where $L^*$ is the lightness, $c^*$ is chroma, and h is hue-angle;

the metallic appearance index is determined by $Y15 \times FF^2$, using the Y15 and FF; the appearance depth index is determined by $c^*R/L^*R$., where Value $L^*$ and Value $c^*$ in the L*c*h color space determined by the spectral reflectance of representative angle are L*R and C*R, respectively; and the Definition is determined by sqrt $(L^{*}R^2+C^{*}R^2)$, using the L*R and c*R, where L*R and C*R are values in the L*c*h color space determined by the spectral reflectance R of representative angle.

2. The method of producing a paint color texture map according to claim 1, wherein the two parameters are a parameter of representing shading appearance of each paint color and a parameter of representing appearance heaviness of each paint color.

3. The method of producing a paint color texture map according to claim 1, wherein the two-dimensional plane is a surface of paper or a resin film, and the plurality of paint colors are arranged on the surface by printing or drawing.

4. A program encoded on a non-transitory computer readable medium for producing a paint color texture map in which a plurality of paint colors are arranged on a two-dimensional plane using coordinate axes of two parameters that represent color and texture of the paint colors, the program causing a computer to execute:

a first function of determining at least three characteristic quantities, using a plurality of spectral reflectances that are measured at a plurality of light-receiving angles for each of the plurality of paint colors, and recorded in a recording apparatus;

a second function of subjecting a data group including the at least three characteristic quantities to principal component analysis so as to determine a First Principal Component and Second Principal Component expressed as linear expressions, using the characteristic quantities; and a third function of calculating values of the First Principal Component and Second Principal Component for each of the plurality of paint colors; and a fourth function of positioning the paint colors on a two-dimensional plane which has the First Principal Component and Second Principal Component as the two parameters and has values of the First Principal Component and Second Principal Component as coordinates, so as to produce image data of a texture map, wherein:

the characteristic quantities are selected from the group consisting of IV (intensity value) value, SV (scattering value) value, FF (flip flop) value, cFF (chroma flip flop), metallic appearance index, appearance depth index, and Definition; the IV value is Value Y (brightness) in the XYZ color space determined by a spectral reflectance measured at a deflection angle 15 degree; the SV value is Value Y in the XYZ color space determined by a spectral reflectance measured at a deflection angle 45 degree;

the FF value is determined by $2\times(Y15-Y45)/(Y15+Y45)$, where Value Y in the XYZ color space determined by a spectral reflectance measured at a deflection angle 15 degree is Y15, and Value Y in the XYZ color space determined by a spectral reflectance measured at a deflection angle 45 degree is Y45;

the cFF value is determined by $2\times(c^{*}15-c^{*}45)/(c^{*}15+c^{*}45)$, where Value c* in the L*c*h color space determined by a spectral reflectance measured at a deflection angle 15 degree is c*15, and Value c* in the L*c*h color space determined by a spectral reflectance measured at a deflection angle 45 degree is c*45, where L* is the lightness, c* is chroma, and h is hue-angle;

the metallic appearance index is determined by $Y15\times FF^2$, using the Y15 and FF;

the appearance depth index is determined by c*R/L*R., where Value L* and Value c* in the L*c*h color space determined by the spectral reflectance of representative angle are L*R and C*R, respectively; and the Definition is determined by sqrt $(L^{*}R^2+C^{*}R^2)$, using the L*R and c*R, where L*R and C*R are values in the L*c*h color space determined by the spectral reflectance R of representative angle.

5. A system for producing a paint color texture map in which a plurality of paint colors are arranged on a two-dimensional plane using coordinate axes of two parameters that represent color and texture of the paint colors, the system comprising:
an arithmetic unit; and
a multiangle spectrophotometer,
wherein:
the multiangle spectrophotometer measures spectral reflectances at a plurality of light- receiving angles for each of the plurality of paint colors, which are then transmitted to the arithmetic unit;

the arithmetic unit determines at least three characteristic quantities, using the plurality of spectral reflectances for each of the plurality of paint colors;

the arithmetic unit subjects a data group including the at least three characteristic quantities to principal component analysis so as to determine a First Principal Component and Second Principal Component expressed as linear expressions, using the characteristic quantities;

the arithmetic unit calculates values of the First Principal Component and Second Principal Component for the plurality of paint colors;

the arithmetic unit positions the paint colors on a two-dimensional plane which has the First Principal Component and Second Principal Component as the two parameters and has values of the First Principal Component and Second Principal Component as coordinates so as to produce a paint color texture map;

the characteristic quantities are selected from the group consisting of IV (intensity value) value, SV (scattering value) value, FF (flip flop) value, cFF (chroma flip flop), metallic appearance index, appearance depth index, and Definition; the IV value is Value Y (brightness) in the XYZ color space determined by a spectral reflectance measured at a deflection angle 15 degree;

the SV value is Value Y in the XYZ color space determined by a spectral reflectance measured at a deflection angle 45 degree;

the FF value is determined by $2\times(Y15-Y45)/(Y15+Y45)$, where Value Y in the XYZ color space determined by a spectral reflectance measured at a deflection angle 15 degree is Y15, and Value Y in the XYZ color space determined by a spectral reflectance measured at a deflection angle 45 degree is Y45;

the cFF value is determined by $2\times(c^{*}15-c^{*}45)/(c^{*}15+c^{*}45)$, where Value c* in the L*c*h color space determined by a spectral reflectance measured at a deflection angle 15 degree is c*15, and Value c* in the L*c*h color space determined by a spectral reflectance measured at a deflection angle 45 degree is c*45, where L* is the lightness, c* is chroma, and h is hue-angle;

the metallic appearance index is determined by $Y15\times FF^2$, using the Y15 and FF; the appearance depth index is determined by c*R/L*R., where Value L* and Value c* in the L*c*h color space determined by the spectral reflectance of representative angle are L*R and C*R, respectively; and the Definition is determined by sqrt $(L^{*}R^2+C^{*}R^2)$, using the L*R and c*R, where L*R and C*R are values in the L*c*h color space determined by the spectral reflectance R of representative angle.

* * * * *